United States Patent
Hallum et al.

(10) Patent No.: US 9,059,449 B2
(45) Date of Patent: Jun. 16, 2015

(54) RAPID THERMAL PROCESSING FOR SOFC MANUFACTURING

(75) Inventors: Ryan Hallum, Mountain View, CA (US); Michael Gasda, Mountain View, CA (US); Arne Ballantine, Palo Alto, CA (US); Ravi Oswal, Fremont, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 644 days.

(21) Appl. No.: 13/428,653

(22) Filed: Mar. 23, 2012

(65) Prior Publication Data

US 2012/0244448 A1   Sep. 27, 2012

Related U.S. Application Data

(60) Provisional application No. 61/467,444, filed on Mar. 25, 2011.

(51) Int. Cl.
*H01M 8/10* (2006.01)
*H01M 8/12* (2006.01)

(52) U.S. Cl.
CPC ............ *H01M 8/1097* (2013.01); *Y10T 156/10* (2015.01); *H01M 8/124* (2013.01); *H01M 2008/1293* (2013.01); *Y02E 60/521* (2013.01); *Y02E 60/525* (2013.01)

(58) Field of Classification Search
CPC ............ H01M 8/1097; H01M 8/124; H01M 2008/1293; Y02E 60/525; Y02E 60/521; Y10T 156/10
USPC .................................. 429/400, 408, 409, 465
See application file for complete search history.

(56) References Cited

U.S. PATENT DOCUMENTS

| | | | | |
|---|---|---|---|---|
| 5,156,697 A | * | 10/1992 | Bourell et al. | 264/497 |
| 5,182,170 A | * | 1/1993 | Marcus et al. | 264/497 |
| 5,286,322 A | * | 2/1994 | Armstrong et al. | 156/89.16 |
| 5,431,967 A | * | 7/1995 | Manthiram et al. | 427/555 |
| 2002/0028367 A1 | * | 3/2002 | Sammes et al. | 429/31 |
| 2003/0228415 A1 | * | 12/2003 | Bi et al. | 427/180 |
| 2004/0001994 A1 | * | 1/2004 | Marina et al. | 429/40 |
| 2005/0016839 A1 | * | 1/2005 | Horne et al. | 204/242 |
| 2005/0042152 A1 | * | 2/2005 | Gardner et al. | 422/186.3 |
| 2006/0093884 A1 | * | 5/2006 | Seabaugh et al. | 429/33 |
| 2006/0134347 A1 | * | 6/2006 | Chiruvolu et al. | 427/585 |
| 2006/0141332 A1 | * | 6/2006 | Cortright et al. | 429/38 |
| 2008/0090309 A1 | | 4/2008 | Ranish et al. | |
| 2008/0096080 A1 | | 4/2008 | Batawi et al. | |
| 2008/0254336 A1 | | 10/2008 | Batawi et al. | |
| 2009/0303660 A1 | | 12/2009 | Nair et al. | |

FOREIGN PATENT DOCUMENTS

KR  10-2009-0117370 A   11/2009
KR  10-2010-0095708 A    9/2010

OTHER PUBLICATIONS

Vyazovkin et al. Vyazovkin (Journal of Physical Chemistry A vol. 101 pp. 7217-7221 1997).*
Abtahi et al Radiation Protection Dosimetry pp. 313-316 1986.*
International Search Report & Written Opinion issued in PCT Application No. PCT/US2012/030320, mailed on Oct. 29, 2012.

* cited by examiner

*Primary Examiner* — Patrick Ryan
*Assistant Examiner* — Aaron Greso
(74) *Attorney, Agent, or Firm* — The Marbury Law Group PLLC

(57) ABSTRACT

Methods of heat treating at least one component of a solid oxide fuel cell (SOFC) system. The method includes heating the at least one component with a rapid thermal process, wherein the rapid thermal process heats at least a portion of the component at a rate of approximately 50° C./sec or more.

29 Claims, 3 Drawing Sheets

RAPID THERMAL PROCESSING FOR SOFC MANUFACTURING

RELATED APPLICATIONS

This application claims the priority benefit of U.S. Provisional Application 61/467,444, filed on Mar. 25, 2011. Application 61/467,444 is incorporated by reference herein in its entirety.

FIELD

The present invention is generally directed to solid oxide fuel cell (SOFC) system components and more particularly to the use of rapid thermal processing (RTP) in manufacturing SOFC system components.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be hydrogen and/or a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

SUMMARY

An embodiment relates to a method of heat treating at least one component of a solid oxide fuel cell (SOFC) system. The method includes heating the component with a rapid thermal process, wherein the rapid thermal process heats at least a portion of the component at a rate of approximately 100° C./min or more.

Another embodiment relates to an apparatus for providing rapid thermal processing of at least one solid oxide fuel cell system component. The apparatus includes a chamber configured to hold the at least one component, and at least one heat source configured to heat at least a portion of the at least one component at a rate of approximately 100° C./min or more. The apparatus also includes openings in the chamber configured to allow at least one process device into the chamber, the at least one process device configured to probe or manipulate the at least one component.

DETAILED DESCRIPTION

The inventors have realized that rapid thermal processing (RTP) of SOFC system components can provide advantages over conventional thermal processing, such as furnace annealing. Rapid thermal processing is a manufacturing process in which an article is rapidly heated to high temperatures in seconds, usually using hot plates, tungsten-halogen lamps, arc lamps, flash lamps, lasers or pulsed electron beams. The rapid thermal process may heat at least a portion of the article at a rate of approximately 100° C./min or more. For example, the rate may be more than 60° C./min (i.e., 1° C./sec), 5° C./sec, 25° C./sec, 50° C./sec, 100° C./sec, 250° C./sec, 500° C./sec, or 1000° C./sec, such as 100° C./min to 1500° C./sec.

The advantages of RTP may include, for example, shorter cycle times, lower equipment costs and reduced energy use. Further, RTP may be performed using single piece flow which allows for lower levels of work in progress (WIP) and typically allows catching defects faster, resulting in reduced scrap. In contrast, furnace annealing often requires annealing of a batch of a large number of system components to achieve acceptable throughput. Thus, processes need not be grouped into batches in an attempt to improve the overall equipment effectiveness (OEE) of the furnace. That is, with RTP each different part can be heat treated with a unique thermal process. RTP may also give the ability to process fuel cells in ways not possible with conventional heat treatment methods. Another advantage may be the ability to move the point of assurance further up the manufacturing line. This may in turn lead to more consistency in the manufacturing process. Use of RTP may also provide the ability to do more rapid research and development.

For the purposes of this application, "doping" means adding an element (e.g., nickel, lanthanum, strontium and the like) or compound (e.g., ceria, yttria) to the matrix of a SOFC component. The element or compound may be charged or neutral. As discussed in more detail below, the dopant(s) may be added to the surface of the SOFC component and thermally diffused into the SOFC component with a rapid thermal annealing process.

Figure 1:
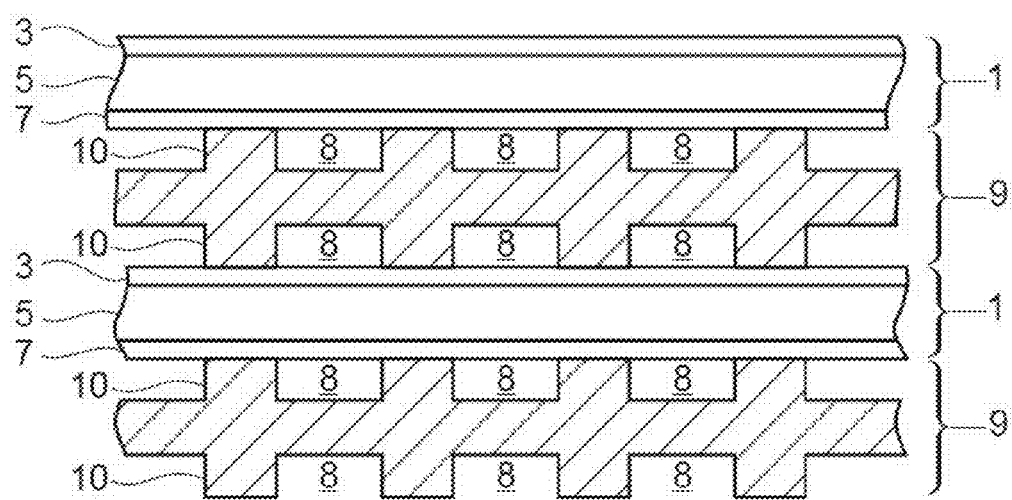
FIG. 1 illustrates a side cross-sectional view of a SOFC stack.

FIG. 1 illustrates a SOFC stack of an embodiment, in which each SOFC 1 comprises a cathode electrode 7, a solid oxide electrolyte 5, and an anode electrode 3. The gas flow separator 9 (referred to as a gas flow separator plate in a planar stack), containing gas flow passages or channels 8 between ribs 10, separates the individual cells in the stack. In an embodiment, the anode electrode 3 may comprise a nickel cermet material. That is, a mixed phase material containing ceramic phase and a nickel containing phase. For example, the anode electrode 3 may comprise a nickel-stabilized zirconia cermet, such as a nickel-yttria stabilized zirconia (YSZ), nickel-scandia stabilized zirconia (SSZ) or a nickel doped ceria cermet such as gadolinia doped ceria (GDC) or scandia doped ceria (SDC). Other cermet materials that may be used are discloses in U.S. patent application Ser. Nos. 11/785,034 and 11/907,204, hereby incorporated by reference in their entirety.

The cathode electrode 7 comprises materials that are electronically conductive, such as conductive perovskite materials. The cathode electrode 7 may comprise, for example, lanthanum strontium manganite (LSM). LSM is advantageous because it is compatible with doped zirconia electrolytes and has a similar coefficient of thermal expansion (CTE) to SSZ or YSZ. Additionally, LSM has low levels of chemical reactivity with YSZ, which extends the lifetime of the material. Composite cathodes comprising LSM and YSZ may also be used. Alternative cathode materials include mixed ionic/ electronic conducting (MIEC) ceramics, such as the perovskite LSCo or LSCr or noble materials (e.g. Pt).

The solid oxide electrolyte 5 may comprise materials such as yttria stabilized zirconia (YSZ) (e.g. the 8% yttria form, scandia stabilized zirconia (SSZ) (e.g. 9 mol % $Sc_2O_3$-9SSZ) and gadolinium doped ceria (GDC). One or more contact materials between the solid oxide electrolyte 5 and the cathode electrode 7 and/or the anode electrode 3 may be provided.

The gas flow separator interconnect 9 may be either a metallic plate that is located between individual cells in a fuel cell stack. The gas flow separator interconnect 9 connects each SOFC in a stack in series, so that the electricity each cell generates can be combined. It also provides the flow passages 8 through which the fuel and the oxidizer flow. Because the gas flow separator 9 is exposed to both the oxidizing and reducing side of the cell at high temperatures, it is preferable that the gas flow separator 9 comprise a material that is stable at high temperatures. In an embodiment, the gas flow separator 9 comprises a chromium-, nickel- or steel-based alloy, such as a chromium alloy containing 4-6 wt % Fe and 0-1 wt % Y.

Figure 2:
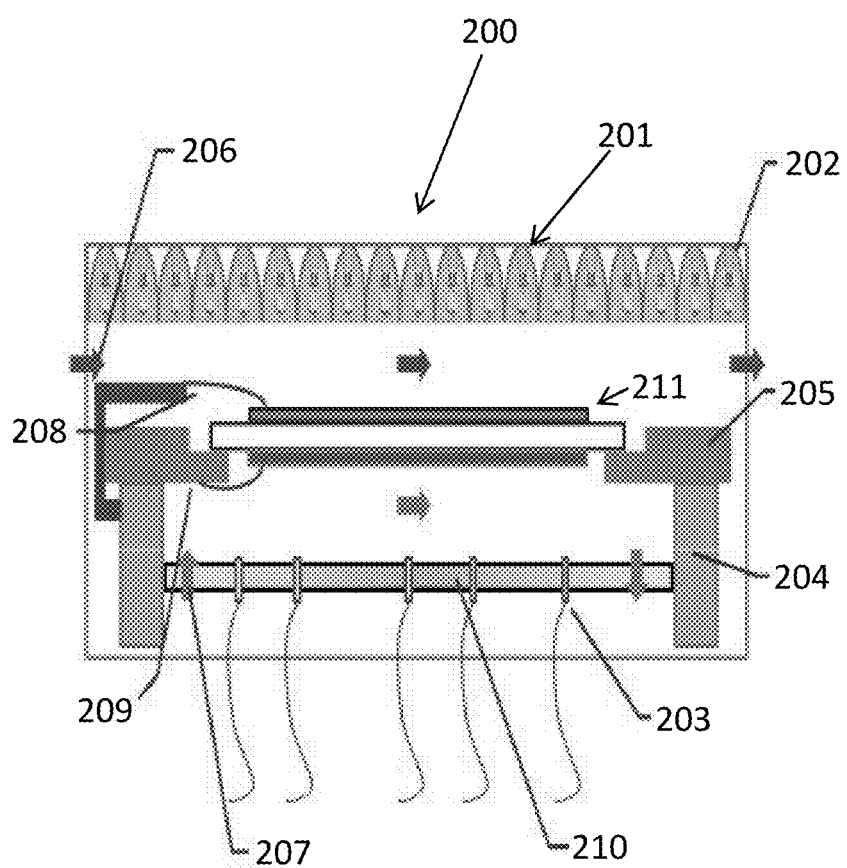
FIG. 2 illustrates an apparatus that may be used for rapid thermal processing of SOFC components according to an embodiment of the invention.

FIG. 2 illustrates a rapid thermal processing apparatus 200 that may be used for rapid thermal processing of SOFC system components 211 according to an embodiment of the invention. SOFC system components 211 include SOFCs 1, seals, and interconnects 9. The rapid thermal processing apparatus 200 includes a chamber 201 in which the SOFC components 211 are placed. Preferably, chamber 201 of the rapid thermal processing apparatus 200 comprises a thermally insulating material. The rapid thermal processing apparatus 200 typically includes a multitude of radiative heat sources 202, however, as few as one radiative heat source 202 may be used. The radiative heat sources 202 may include, but are not limited to, lamps, lasers and pulsed electron beams.

As illustrated in FIG. 2, the radiative heat sources 202 are located on the top wall of the chamber 201. In alternative embodiments, the radiative heat sources 202 may be located on the bottom wall, one or more side walls, or any combination of the top, side, and bottom walls. In this manner, different intensities of radiation may be supplied to different sides or different portions of the same surface of the SOFC system component 211. Further, different ones or different sets of the multiple radiative heat sources 202 may be operated for different amounts of time and/or different intensities. In this way, different amounts of radiation may be supplied to different sides or different portions of the same surface of the SOFC system component 211. For example, one side of an SOFC system component 211, such as an anode electrode 3, may be heated with a high intensity, short time flash (e.g., 1 to 1,000 ms long flash) of radiation from a flash lamp such that anode electrode 3 is heated independently from the cathode electrode 7. In this manner, the anode electrode 3 can be reduced, burned out or sintered without damaging the cathode electrode 7 and without isolating the anode side from the cathode side of the SOFC system component 211, such as a SOFC cell. For example, the anode may be reduced using the short duration flash pulse on the anode while flowing hydrogen or another reducing gas on both the anode and the cathode sides of the cell. In general, the intensity and time duration of the radiation on each side of the component 211 (e.g., on the anode and cathode sides of a SOFC cell) to independently control the heating, such as sintering or co-firing of each side (e.g., anode and cathode electrodes) of the component.

Additionally, as illustrated, the rapid thermal processing apparatus 200 includes an optional reflector plate 210 located on an opposite side of the SOFC system component(s) 211. The reflector plate 210 reflects radiation from the radiative heat sources 202 to the underside of the SOFC system component 211, thereby heating the lower surface of the SOFC system component 211 and reducing thermal gradients within the SOFC system component 211.

Optionally, a plurality of temperature measuring devices 203, such as pyrometers, may be arrayed along the reflector plate 210. In an embodiment, the temperature measuring devices 203 may be operationally linked to the radiative heat sources 202 via a controller (not shown). In this embodiment, the power to the radiative heat sources 202 may be individually controlled such that the radiation output (e.g., time and/or intensity) of the radiative heat sources 202 is adjusted based on the temperature sensed by the temperature measuring devices 203. In this manner, feedback from the temperature measuring devices 203 may be used to reduce or eliminate temperature gradients in the SOFC system component 211.

The SOFC system component 211 may be held in place with a securing structure 205, such as a susceptor ring. When using a susceptor ring, the susceptor ring may comprise a material that absorbs the radiation (e.g., ultraviolet radiation) used in the rapid thermal process and converts it to heat. The securing structure 205 may comprise a ceramic, e.g. alumina or an alumina fiber composite. The securing structure 205 is supported by support structure 204 which may be rotatably connected to a motor (not shown). In this way, the SOFC system component 211 can be rotated in the chamber 201 to reduce thermal gradients across the top and/or bottom surfaces of the SOFC system component 211. This configuration operates similar to a microwave oven with a rotatable patter. In an alternative embodiment, the rapid thermal processing apparatus 200 includes a continuous roll or conveyer belt (not shown) for continuous operation. Alternatively, the securing structure 205 is sufficiently large so that more than one SOFC system component 211 can be processed at a time.

The rapid thermal processing apparatus 200 may optionally include a screen printer (not shown)(e.g., a screen print frame and an ink source). Other optional features include, a seal dispensing device (e.g., a vitreous state glass or glass ceramic dispenser) and a pre-heating and/or post-treatment furnace(s) (e.g., resistive or inductive furnaces). Still other optional features include a belt furnace and a robot. The robot may be configured to transfer the SOFC system component 211 from the belt furnace to the chamber. The rapid thermal processing apparatus 200 may also optionally include a lifting mechanism to aid in transferring the SOFC system component 211 to and from the securing structure 205 in the rapid thermal processing apparatus 200.

In an embodiment, the rapid thermal processing apparatus 200 includes one or more probes (e.g., lower probe 207 and/or upper probe 208) which can be used to measure electrical or mechanical properties of the SOFC system component 211 as it is being heat treated. For example, the lower probe 207 and the upper probe 208 can be configured to measure the electrical conductivity through the SOFC system component 211. A change in conductivity to a predetermined level may indicate that a rapidly thermal process induced phase change of the material of the component 211 has been completed and thermal processing should end. The conductivity may be measured through-plane or in-plane. Alternatively, electrochemical impedance spectroscopy may be used to measure through-plane or in-plane component properties or the mechanical strength of the component may be measured. Alternatively, the propagation of material defects due to thermal stress or strain may be measured to find cracks or mechanical stress or strain may be applied with the probes to measure effects of stress or strain on electrical and/or physical/mechanical properties of the component. Alternatively, the lower probe 207 or the upper probe 208 may be configured to apply sufficient stress to seal two component parts together during rapid thermal processing.

In another embodiment, the rapid thermal processing apparatus 200 includes a front side purge 206 and/or a backside purge 207. The front side purge 206 and the backside purge 207 may include conduits for supplying reactive gases such as oxygen and air or inert gases such as nitrogen, argon, helium and the like. The reactive gases may include atoms which may be incorporated into the SOFC system component 211 and thereby act as alloying elements or dopants. In one embodiment, either the front side purge 206 or the backside purge 207 provides a reactive gas while the other provides an inert gas. In this manner, one portion or surface of the SOFC system component 211 can be reactively processed while other portion or surface is protected by the inert gas. Alternatively, the inert gas may be used as a coolant. In this manner, one side of the SOFC system component 211 may be cooled while the other side is heated. Alternatively, one side of the SOFC system component 211 may be cooled with a cold plate (heat sink), flowing different gases (which may or may not be at the same temperature) on different sides of the SOFC system component 211 or flowing gas on one side of the SOFC system component 211 while the other side is shielded (for example with a protective layer).

Doping may be accomplished by flowing a gas comprising a metal or a rare earth element across the electrolyte while heating the anode electrode 3, the cathode electrode 7 or the solid oxide electrolyte 5 using rapid thermal processing. Suitable dopants include, but are not limited to, nickel, lanthanum, strontium, manganese and rare earth elements. Doping may also be accomplished deposition of a material on the SOFC system component 211 by: (A) screen printed or rolled-on inks, (B) physical or chemical vapor deposition, (C) DC or RF plasma sputtering or magnetron sputtering, (D) ink-jet or other printing, (E) plasma spray deposition, (F) arc-discharge, (G) electron beam deposition and (H) atomic layer deposition, followed by heating the deposited material using rapid thermal processing to diffuse a dopant from the material throughout the at least one of the cell anode, cathode or electrolyte.

In an embodiment, the anode electrode 3 and the cathode electrode 7 are printed on the opposite sides of the solid oxide electrolyte 5 by ink screen printing. The printing process typically includes using a binder which facilitates SOFC electrode deposition but is removed by burn out after electrode deposition. In this embodiment, rapid thermal processing may be used to burn off the binders from the printed SOFC anode 3 and/or the printed SOFC cathode 7. Typically, this embodiment is performed in a reactive, oxidizing atmosphere. Additionally, as the SOFC anode electrode 3 and the SOFC cathode electrode 7 comprise different materials, burn off may be performed at a first anode burn off temperature and a second cathode burn off temperature. That is, the SOFC anode electrode 3 or the SOFC cathode electrode 7 can be deposited, burn off performed and then the other electrode is deposited and a second burn off performed. Alternatively, the binder from a green electrode may be burned off before sintering it.

Burning off the binders from the printed SOFC anode electrode 3, printed SOFC cathode electrode 7 and the solid oxide electrolyte 5 may result in the generation of an off-gas. In this case, the off-gas may be removed by flowing a carrier gas (e.g., provided through the front side purge 206 and/or the backside purge 207). Alternatively, the off-gas may be removed by generating a vacuum, controlling a temperature and/or a ramp rate of rapid thermal processing, or burning off the binders prior to the rapid thermal process.

Burning off the binders without further heat treatment, however, may result in mechanically weak SOFC electrodes 3, 7. Thus, in an embodiment, the SOFC electrodes 3, 7 may be further rapid thermal processed to sinter the SOFC anode 3 and/or the SOFC cathode 7. In this embodiment, the SOFC system component 211 is heated to an appropriate sintering temperature. In addition to sintering the SOFC electrode 3, 7, the SOFC electrolyte 5 or the gas flow separator interconnect 9 may be sintered by rapid thermal processing. Note, the sintering temperatures of the anode electrode 3, the cathode electrode 7, and the solid oxide electrolyte 7 may be the same or different. In an embodiment, the SOFC electrolyte 5 or the gas flow separator interconnect 9 may be first rapid thermal processed at a low temperature for binder burn off and then at a higher temperature to sinter. In an embodiment, one of the anode electrode 3 or the cathode electrode 7 is deposited. A low temperature rapid thermal process is performed for burn off and then a higher temperature rapid thermal process is performed to sinter the electrode. Next, the other electrode is deposited followed by a low temperature burn off and a high temperature sinter. In an alternative embodiment, a strengthening layer may be deposited on the SOFC electrolyte 5 and then sintered using rapid thermal processing. Alternatively, the gas flow separator interconnect 9 may be formed by powder metallurgy pressing of mixture of iron and chromium powder followed by a high temperature rapid thermal process to sinter the powders.

In an embodiment, the SOFC anode 3 and/or SOFC cathode 7 are printed with materials in an oxidized state that are then reduced (e.g., NiO may be deposited and reduced to Ni in the anode). In this embodiment, the SOFC anode 3 and/or the SOFC cathode 7 may be reduced by rapid thermal processing in a reducing atmosphere, for example containing hydrogen or forming gas. In another embodiment, rapid thermal processing can be performed in a reactive atmosphere. In this manner, the SOFC electrolyte 5, the SOFC anode 3, and/or the SOFC cathode 7 may be doped. In this embodiment, extra oxygen may be introduced into LSM cathode or YSZ or SSZ electrolyte. In an alternative embodiment, rapid thermal processing may be performed to diffuse the printed SOFC anode 3 into the SOFC electrolyte 5 or diffuse the SOFC cathode 7 into the SOFC electrolyte 5.

In an alternative embodiment, the conductivity of the SOFC electrolyte 5 can be checked (monitored) during rapid thermal processing with the lower probe 207 and/or the upper probe 208. Alternatively, the electrochemical performance of the SOFC 1 may be monitored, such as by measuring the voltage, current or capacitance of the SOFC using the lower probe 207 and/or the upper probe 208. In another embodiment, the mechanical integrity of the SOFC electrolyte 5 is checked during rapid thermal annealing.

In another embodiment, a Cr diffusion barrier may be applied to the gas flow separator interconnect 9 by depositing a Cr containing alloy and rapid thermal processing. In another embodiment, a stack of SOFCs and interconnects 9 is rapid thermal processed to burn out binders from a SOFC stack sealing material. Rather than burning out the binders, the SOFC stack can be heated to a more moderate temperature resulting in melting and flow of the SOFC stack sealing material (e.g., glass or glass ceramic seals) to seal the interconnects 9 to the cells. In an embodiment, a SOFC stack can be rapid thermal processed to break the seals and then singulated into individual SOFC cells for SOFC stack refurbishment. Additionally, the singulated SOFC electrolytes 5 bound to gas flow separator interconnects 9 can be removed from the gas flow separators interconnects 9 after the SOFC stack singulation by rapid thermal processing to break or melt seals holding the cell and interconnect together.

Singulation may be achieved by applying heat using rapid thermal processing to a top cell or interconnect of a SOFC stack, causing thermal expansion to break a seal. Alternatively, singulation may be achieved by applying heat using rapid thermal processing to one lateral side of the SOFC stack, causing thermal expansion to break apart all the seals in a stack of fuel cells. Additionally, consistent thermal shock using rapid thermal processing may be applied to the SOFC stack in an automated process.

In an embodiment, the SOFC cathode electrode 7 is formed prior to depositing and rapid thermal processing the anode. In the embodiment, the cathode may be protected while processing the anode. The cathode electrode 7 may be protected by performing anode reduction for a period of time, such as milliseconds to seconds, such as 1 millisecond to 10 seconds, including 10 to 500 milliseconds, which is insufficient to damage the cathode electrode 7. Alternatively, the cathode electrode 7 may be protected by flowing a reducing gas over the anode electrode 3 and an inert gas over the cathode electrode 7 or preferably flowing an inert gas at a higher pressure than the reducing gas to the cathode electrode 7 to force the reducing gas away from the cathode. Alternatively, cathode electrode 7 may be protected by placing the anode electrode 3 in a vacuum or sealed in a chamber with hydrogen while the cathode electrode 7 is in an inert environment, or mechanically separating (e.g., locating in separate chambers) the cathode electrode 7 from the anode electrode 3 to prevent the reducing gas from reaching the cathode. Alternatively, the cathode may be actively cooled (e.g., with a cooling gas from the front side purge 206 or the backside purge 207.

In an alternative embodiment, the SOFC anode is reduced prior to depositing the cathode electrode 7 on the electrolyte 5. In this embodiment, the method may include sintering the cathode material for a period of time, such as milliseconds to seconds, such as 1 millisecond to 10 seconds, including 10 to 500 milliseconds, which is insufficient oxidize the anode 3. Alternatively, the method may include flowing a reducing gas over the anode electrode 3 for protection and an inert gas over the cathode electrode 7 or preferably flowing an inert gas at a higher pressure than the reducing gas to the cathode material to force the reducing gas away from the cathode electrode 7. The method may include placing the anode electrode 3 in a vacuum or in a sealed chamber with a reducing gas while the cathode electrode 7 is in an inert environment, or mechanically separating (e.g., locating in separate chambers) the cathode electrode 7 and anode electrode 3 to prevent oxygen from the cathode side of SOFC from reaching the anode electrode 3. Alternatively, the method may include cooling the anode electrode 3 to prevent oxidation or performing an entire cathode treatment process in an inert gas environment (e.g., with a cooling gas from the front side purge 206 or the backside purge 207).

In another embodiment, the method may further include applying stack sealing material (e.g. glass or glass ceramic seals) to the gas flow separator interconnect 9 or the solid oxide electrolyte 5. The method may further include applying mechanical pressure to the stack sealing material to set the seal dimensions, and melting the seal material by rapid thermal processing while pressing it between the gas flow separator interconnect 9 and the SOFC electrolyte to create a repeat unit of the stack.

In an embodiment, different electrical and/or mechanical properties can be achieved in different regions of the SOFC system component 211, that is different x-y locations in the SOFC system component 211 can be processed to have different properties. This may be accomplished, for example, by applying different intensity lamps across the surface of the SOFC system component 211. Alternatively, this may be accomplished by flowing different gasses across different portions of the surface or different surfaces of the SOFC system component 211, or using lasers to react the surface of the SOFC system component 211 with a material in a predetermined pattern. By flowing different gasses across different portions of the surface or different surfaces of the SOFC system component 211, different dopants (and dopant concentrations) can be introduced into different portions of the surface or different surfaces of the SOFC system component 211. The size of the dopant and charge (if charged) both effect the properties of the doped material. The amount of annealing, whether by lamp or laser, effects the degree of crystallization and grain size, also effecting the properties of the material of the processed SOFC system component 211.

Alternatively, the method may include controlling the position of the SOFC system component 211 in chamber 201 such that a first portion of the component is fully exposed to the heat and a second portion is partially exposed to the heat. Alternatively, the method includes using a mask to pattern or induce a gradient in a composition, porosity, thickness, diffusion lengths, or other physical property (e.g., larger size openings in the mask allow a greater amount of dopant or radiation to reach the underlying SOFC system component 211 relative to smaller opening, providing a range of opening sizes therefore allows for a gradient in properties), or using a reflector, an aperture, or a lens to magnify, attenuate, or alter the intensity of the rapid thermal processing radiation or exposure time of the rapid thermal processing radiation across the SOFC system component 211.

Heating may be performed with different variations of ramping and holding steps. In an embodiment, heating using rapid thermal processing includes ramping the temperature to a first temperature and holding at the first temperature though all steps of a multitude of steps. Alternatively, the method includes applying a heating step for each step of the multitude of steps including spiking to the process temperature and then cooling down between each of the heating steps. The process temperature for each of the steps may be the same or different from any of the other steps. Alternatively, rapid thermal processing may be performed by ramping to a first temperature and holding at the first temperature for a first period of time then spiking to a second temperature and holding at the second temperature for a second period of time.

In an embodiment, the rapid thermal processing may be adjusted according to one or more conditions. For example, the processing may be adjusted by stopping a binder burn-out based on changes in chamber effluent. Alternatively, the processing may be adjusted by stopping an anneal based on electrical performance of the at least one component or performing feed-forward process adjustments by measuring anode or cathode conductivity and altering the rapid thermal process based on the result of the measurement. Alternatively, the processing may be adjusted by biasing an anneal mean temperature center-to-edge to compensate for a deposit which might be too thick/thin center to edge.

In an embodiment, the method further includes providing dummy quartz gas flow separators to encapsulate the solid oxide electrolyte 5 during rapid thermal processing. The quartz gas flow separators may be configured as a heat sink on one side of electrolyte or a mask to diminish the intensity of radiation across the solid oxide electrolyte 5. The dummy quartz gas flow separators may be removed before placing the cells in the stack.

Figure 3:
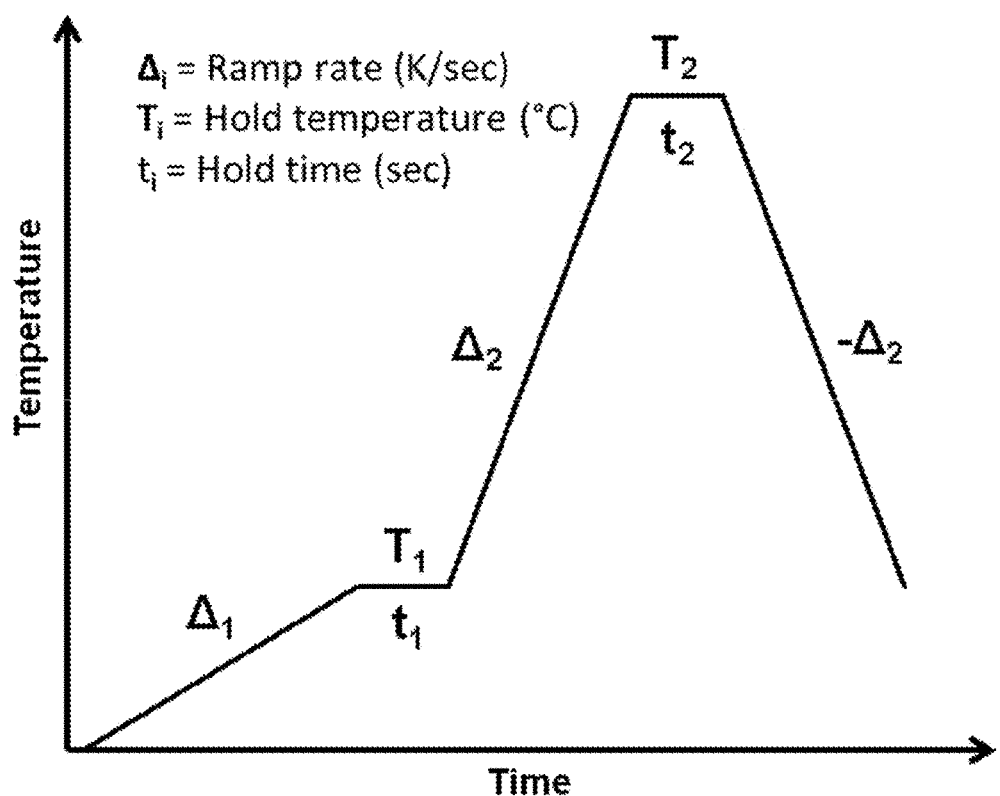
FIG. 3 is a time temperature plot illustrating an example rapid thermal processing scheme according to an embodiment.

FIG. 3 illustrates an example rapid thermal processing scheme according to an embodiment. According to this scheme, the SOFC system component 211 is heated at a first ramp rate $\Delta_1$ until reaching a temperature $T_1$. The SOFC system component 211 is held at this temperature for a time $t_1$ and then heated at a second ramp rate $\Delta_2$ until reaching a temperature $T_2$. The SOFC system component 211 is held at this temperature for a time $t_2$ and then cooled. As illustrated, the second ramp rate $\Delta_2$ is greater than the first ramp rate $\Delta_1$. In an alternative embodiment, the first ramp rate $\Delta_1$ is greater than the second ramp rate $\Delta_2$. The first and second hold times $t_1$, $t_2$ may be the same or different from each other. If different, either hold time may be the longer or the shorter. Further, rapid thermal processing is not limited to two ramp events. Rapid thermal processing may be performed with one, three, four or any number of ramp events. Further, as illustrated, the cooling portion of the scheme is performed at a rate equal to the negative of the second ramp rate $\Delta_2$. This is for illustration only. The cooling portion of the scheme is independent of the heating portion. Further, similarly to the heating portion, the cooling portion of the rapid thermal processing scheme may be performed in a series of steps with or without holding portions.

As an example, a green anode electrode 3 or green cathode electrode 7 may be heated at a first ramp rate $\Delta_1$ of 2° C./sec for a low temperature binder burn out and heated at a second rate $\Delta_2$ of 6-20° C./sec for sintering. In another example, a cathode ink qualification can be performed by first heating at a first ramp rate $\Delta_1$ of about 5° C./sec, such as 5.3° C./sec, and then heated at a second rate $\Delta_2$ of about 6° C./sec, such as 6.5° C./sec. Electrolyte conductivity and electrochemical testing may be performed using a rapid thermal processing scheme with a single ramp rate $\Delta$. The ramp rate may be in the range of 4-6° C./sec, such as 5° C./sec.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. For example, rapid thermal processing may be used for any one or any combination of steps described above. All of the publications, patent applications and patents cited herein are incorporated herein by reference in their entirety.

What is claimed is:

1. A method of heat treating at least one component of a solid oxide fuel cell (SOFC) system comprising heating the at least one component with a rapid thermal process, wherein the rapid thermal process heats at least a portion of the component at a rate of approximately 100° C./min or more,
   wherein the heating comprises at least one of:
   singulating SOFC cells for SOFC stack refurbishment; or
   removing the singulated SOFC cell electrolytes from interconnects during the SOFC stack refurbishment; and
   wherein singulating the SOFC cells for stack refurbishment or removing the SOFC cell electrolytes from the interconnects during refurbishment comprises performing one or more of the following:
   applying heat using rapid thermal processing to a top layer causing thermal expansion to break a seal;
   applying heat using rapid thermal processing to one side causing thermal expansion to break apart all the cells in a stack of fuel cells; or
   applying consistent thermal shock using rapid thermal processing to the at least one component in an automated process.

2. The method of claim 1, wherein the heating comprises exposing the at least one component to radiation from a heat lamp, laser, or pulsed electron beam.

3. The method of claim 1, wherein the heating comprises singulating the SOFC cells for the SOFC stack refurbishment.

4. The method of claim 2, wherein the at least one component has a first side and a second side, the method further comprising exposing the at least one component to a first intensity radiation on the first side and a second intensity radiation on the second side, wherein the second intensity is different from the first intensity.

5. The method of claim 1, wherein the at least one component has a first side and a second side, the method further comprising exposing the at least one component to radiation for a first amount of time on the first side and a second amount of time on the second side, wherein the second amount of time is different from the first amount of time.

6. The method of claim 1, wherein the at least one component has a first side and a second side, the method further comprising exposing the component to radiation on the first side while cooling the component on the second side.

7. The method of claim 1, where cooling comprises at least one of (i) using a cold plate, (ii) using a first gas flow on the first side and a second gas flow on the second side, where the gas flows on the first and second sides are different, or (iii) flowing gas on one side and shielding the other side of the at least one component.

8. The method of claim 1, wherein the heating comprises removing the singulated SOFC electrolytes from interconnects during the SOFC stack refurbishment.

9. The method of claim 3, further comprising removing the singulated SOFC electrolytes from interconnects during the SOFC stack refurbishment.

10. A method of heat treating a solid oxide fuel cell comprising a printed anode, a printed cathode and an electrolyte disposed between the anode and the cathode, the method comprising:
   using rapid thermal processing to heat at least a portion of the cell at a rate of at least about 5° C./sec, during at least one heating operation selected from:
   heating the cell to a binder burnout temperature in a gas environment conducive to removing a binder from the anode and a binder from the cathode;
   heating the cell to a cathode sintering temperature;
   heating the cell to an anode sintering temperature;
   introducing a doping gas and heating the cell to a doping temperature; and
   reducing the anode; and
   checking the cell for at least one of conductivity or performance during the at least one heating operation; and
   cooling the cell.

11. The method of claim 10, wherein heating the cell to the binder burnout temperature further comprises heating the cell to an anode binder burnout temperature and to a cathode binder burnout temperature, wherein the anode binder burnout temperature is different from the cathode binder burnout temperature.

12. The method of claim 10, wherein the anode sintering temperature is different from the cathode sintering temperature.

13. The method of claim 10, further comprising supplying an anode side gas to the anode and a cathode side gas to the cathode, wherein the anode side gas is the same as or different from the cathode side gas.

14. The method of claim 10, wherein heating the cell to the binder burnout temperature comprises burning off the binders from the anode and burning off the binders from the cathode which results in a generation of an off-gas, and the method further comprises removing the off-gas by at least one of flowing a carrier gas, generating a vacuum, controlling a temperature and/or a ramp rate of rapid thermal processing, or burning off the binders prior to the rapid thermal process.

15. The method of claim 10, wherein reducing the anode comprises flowing a reducing gas through a chamber while heating the anode using rapid thermal processing.

16. A method of heat treating a solid oxide fuel cell (SOFC) in a chamber, the SOFC comprising a printed anode, a printed cathode, and an electrolyte disposed between the cathode and the anode, the method comprising:
  reducing the anode by heating the anode, at a rate of approximately 5° C./min or more, while flowing a reducing gas into the chamber; and
  protecting the cathode from reduction while reducing the anode by:
    performing the anode reduction for a period of time insufficient to damage the cathode;
    flowing a reducing gas over the anode and an inert gas over the cathode;
    flowing an inert gas at a higher pressure than the reducing gas to the cathode electrode to force the reducing gas away from the cathode;
    placing the anode in a vacuum with hydrogen while the cathode is in an inert environment;
    mechanically separating the cathode from the anode to prevent the reducing gas from reaching the cathode; or
    actively cooling the cathode.

17. The method of claim 10, wherein the component is a SOFC wherein the SOFC anode is reduced prior to applying the cathode electrode to the SOFC, the method further comprises at least one of:
  heating the cathode for a period of time insufficient oxidize the anode;
  flowing a reducing gas over the anode for protection and an inert gas over the cathode;
  flowing an inert gas at a higher pressure than a reducing gas to the cathode to force the reducing gas away from the cathode;
  placing the anode in a vacuum with reducing gas while the cathode is in an inert environment;
  mechanically separating the cathode and the anode to prevent oxygen from a cathode side of SOFC from reaching the anode;
  cooling the anode to prevent oxidation; or
  performing an entire cathode treatment process in an inert gas environment.

18. The method of claim 1, wherein the at least one component comprises a solid oxide electrolyte, the method further comprising checking a quality of the electrolyte by at least one of:
  measuring electrolyte conductivity through-plane or in-plane; or
  measuring electrochemical impedance spectroscopy through-plane or in-plane; or
  measuring mechanical strength; or
  propagating material defects through thermal stress to find cracks.

19. The method of claim 10, further comprising:
  applying a stack sealing material to an interconnect or an SOFC electrolyte;
  applying mechanical pressure to the stack sealing material to set seal dimensions; and
  melting and pressing the stack sealing material between the interconnect and the SOFC electrolyte to create a repeat unit.

20. The method of claim 10, wherein introducing a doping gas and heating the cell to a doping temperature comprises:
  doping the electrolyte by flowing a gas comprising a rare earth element across the electrolyte while heating the electrolyte using rapid thermal processing;
  doping the anode with a rare earth element while heating the anode using rapid thermal processing; or
  doping the cathode with lanthanum, strontium or a rare earth element while heating the cathode using rapid thermal processing.

21. The method of claim 20, wherein the doping is performed by a method selected from the group consisting of (A) screen printed or rolled-on inks, (B) physical or chemical vapor deposition, (C) DC or RF plasma sputtering or magnetron sputtering, (D) ink-jet or other printing, (E) plasma spray deposition, (F) arc-discharge, (G) electron beam deposition and (H) atomic layer deposition, followed by heating using rapid thermal processing to diffuse dopant throughout the at least one of anode, cathode or electrolyte.

22. The method of claim 1, further comprising obtaining x-y differences in properties of the at least one component comprising performing one or more of the following:
  applying different intensity lamps across a surface of the at least one component;
  flowing different gasses across a surface of the at least one component;
  using lasers to react the surface of the component with a material in a predetermined pattern;
  controlling a position of the at least one component in a chamber such that a first portion of the component is fully exposed to the heat and a second portion is partially exposed to the heat;
  using a mask to pattern or induce a gradient in a composition, porosity, thickness, diffusion lengths, or other physical property; or
  using a reflector, an aperture, or a lens to magnify, attenuate, or alter an intensity of the rapid thermal processing radiation or exposure time of the rapid thermal processing radiation across the component.

23. The method of claim 10, wherein two or more of the heating operations are preformed, and the heating operations further comprise:
  a ramping to a first temperature and holding at the first temperature though all of the operations;
  spiking to a process temperature during each operation and cooling down between each heating operation; or
  ramping to a first temperature and holding at the first temperature for a first period of time then spiking to a second temperature and holding at the second temperature for a second period of time during each heating operation.

24. The method of claim 1, wherein the rapid thermal process heats at least a portion of the component at a rate of approximately 5° C./sec or more.

25. The method of claim 24, wherein the rapid thermal process heats at least a portion of the component at a rate of approximately 25° C./sec or more.

26. The method of claim 25, wherein the rapid thermal process heats at least a portion of the component at a rate of approximately 50° C./sec or more.

27. The method of claim 1, wherein singulating the SOFC cells for stack refurbishment or removing the SOFC cell electrolytes from the interconnects during the refurbishment comprises applying heat using rapid thermal processing to a top layer causing thermal expansion to break a seal.

28. The method of claim 1, wherein singulating the SOFC cells for stack refurbishment or removing the SOFC cell electrolytes from the interconnects during the refurbishment comprises applying heat using rapid thermal processing to one side causing thermal expansion to break apart all the cells in a stack of fuel cells.

29. The method of claim 1, wherein singulating the SOFC cells for stack refurbishment or removing the SOFC cell electrolytes from the interconnects during the refurbishment comprises applying consistent thermal shock using rapid thermal processing to the at least one component in an automated process.

* * * * *